UNITED STATES PATENT OFFICE 2,193,944

ALKYLATION PRODUCTS OF AROMATIC COMPOUNDS AND A PROCESS OF PREPARING THEM

Adolf Steindorff and Carl Platz, Frankfort-on-the-Main, and Johann Rosenbach, Wiesbaden, Germany, assignors to I. G. Farbenindustrie Aktiengesellschaft, Frankfort - on - the - Main, Germany No Drawing. Application February 1, 1938, Serial No. 188,200. In Germany December 8, 1934

1 Claim. (Cl. 260—457)

The present invention relates to alkylation products of aromatic compounds and to a process of preparing them.

This application is a continuation-in-part of our application Serial No. 53,674, filed December 9, 1935.

In our application Ser. No. 53,674 and our co-pending application Ser. No. 164,812, which is a continuation-in-part of application Ser. No. 53,674, it has been described that several alkyl groups may be introduced in a smooth reaction and with good yields into mono- or poly-nuclear aromatic compounds containing an aliphatic substituent to which at least one hydrophilic group is linked. The smooth introduction of the alkyl groups into the said compounds is surprising. It is particularly remarkable that several alkyl radicals may be introduced with ease into the aforesaid aromatic compounds containing an aliphatic radical to which at least one hydrophilic group is linked since, as is known, the manufacture of higher alkylated products from, for instance, benzene and benzoic acid causes great difficulties.

As mono- or poly-nuclear bodies, containing aliphatic substituents to which at least one hydrophilic group is linked, there may be used, for instance, the following compounds: phenyl-acetic acid, ethyl-phenylacetic acid, alpha-phenyl-butyric acid, hydro-cinnamic acid, naphthyl-acetic acid, acenaphthenyl-acetic acid, phenyl-ethyl alcohol, benzyl-amine, phenyl-ethylamine; furthermore, mono-benzyl ether of triglycol having the formula:

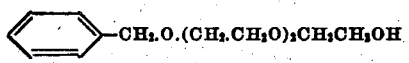

As hydrophilic groups, there may therefore be named, for instance, the following: —OH, —COOH, —NH$_2$ or mono- or di-substituted amino groups or a quaternary ammonium group, a polyglycol or polyglycerol radical.

As aliphatic radicals to be introduced into the aforesaid aromatic compounds, which radicals may be substituted or interrupted by heteroatoms, there may be named, for instance: ethyl-, propyl-, isopropyl-, butyl-, isobutyl-, isohexyl-, lauryl-, tertiary butyl-, chlorohexyl-, oxybutyl-, butyl-hydroxyethyl radicals. The aliphatic radicals to be introduced into the aromatic nucleus may be the same or may be different from each other. The following compounds, for instance, are adapted for the alkylation of the above mentioned bodies: propyl-, butyl-, hexyl-, lauryl-, stearyl-, isobutyl-alcohols, monobutylglycol or the olefines corresponding to these alcohols such as, for instance, propylene, isobutylene, dodecylene, furthermore their halogen substitution products.

As condensing agents there may be used: sulfuric acid monohydrate, dilute sulfuric acid, oleum, phosphoric acid, boron trifluoride, metal halides and the like.

The condensation of the alcohols or olefines takes place mainly in the aromatic nucleus. In the condensation of phenylacetic acid with butyl alcohol in the presence of sulfuric acid, butylated phenylacetic acids are formed. The process may also be performed, for instance, by treating benzyl alcohol with 3 mols of ethylene oxide and alkylating the monobenzyl-triglycollic ether thus formed or the naphthylacetic acid may be transformed into the polyisohexylnaphthylacetic acid by a treatment with isohexyl alcohol and sulfuric acid.

The condensation products which correspond to the following general formula:

$$A \cdot R_1 \cdot X$$

wherein A stands for an aromatic ring system which is substituted by at least two aliphatic radicals, R$_1$ means an aliphatic radical and wherein X stands for a hydrophilic group, for instance, OH, COOH, NH$_2$ or a substituted NH$_2$-group, for instance, di-, tri- and tetrabutylphenyl-acetic acid, tetrabutyl-naphthylacetic acid, di-isohexyl-hydrocinnamic acid, di-isopropyl-naphthylacetic acid, insofar as they contain acid or basic groups, may be transformed into salts or they may be sulfonated by a treatment with sulfuric acid. If there is present an amino group, it may be caused to react with alkylating agents, with alkylene oxides, with aliphatic compounds containing reactive halogen, for instance, chloracetic acid.

The carboxylic acids obtainable according to the present process may also be condensed with hydroxy- or amino-alkyl-, or -cycloalkyl- or hydroxy- or amino-aryl-sulfonic acids or -sulfuric acid esters. Instead of the carboxylic acids, there may also be used for this condensation esters, chlorides or anhydrides thereof. Suitable hydroxy-alkyl or -cycloalkyl- or hydroxy-aryl-sulfonic acids are, for instance: hydroxy-ethane-sulfonic acid, hydroxy-ethyloxyethane-sulfonic acid (HO—CH$_2$—CH$_2$—O—CH$_2$—CH$_2$—SO$_3$H), 1.3-hydroxy-propane-sulfonic acid, 1.2-dihydroxy-propane-3-sulfonic acid, cyclohexanol-sulfonic acid, para-phenol-sulfonic acid, ortho-cresol-sulfonic acid, beta-naphthol-sulfonic acid. As aliphatic or cyclo-aliphatic or aromatic sulfonic acids or sulfuric acid esters there may be named: taurine, methyl-taurine, alpha-ethyl-hexyl-taurine, hydroxy-ethyl-taurine, methyl-amino-ethyl-hydroxy-ethane-sulfonic acid (CH₃—NH—CH₂—CH₂—O—CH₂—CH₂—SO₃H)

phenyl-taurine, sulfanilic acid, metanilic acid, naphthionic acid. Condensation products are thus obtained which correspond with the following general formula:

wherein R₁ stands for an aliphatic hydrocarbon radical of at least 3 carbon atoms, n is a whole number higher than 1, A stands for an aromatic radical, R₂ means an aliphatic hydrocarbon radical, X is a member of the group consisting of O, NH, —N-alkyl, —N-aryl, R₃ is an organic radical, Z is a member of the group consisting of SO₃H and OSO₃H. The condensation products thus obtained are distinguished by a good stability towards the agents causing the hardness of water.

The products are particularly valuable as they have properties of capillary activity. They are distinguished by a high wetting and emulsifying action. They have a cleansing power which surpasses that of the alkali salts of higher molecular fatty acids. They may, therefore, be used for all washing and cleansing processes, for instance, for washing white goods, in the textile industry for washing loose wool, for washing piece goods. Some of them, particularly those which contain sulfo-, ester-sulfuric acid, or polyglycol ether radicals, have high stability in the presence of acids, alkalies and salts that cause the hardness of water, so that they may be used with advantage, for instance, in dye-baths, in carbonizing baths or in kier-boiling.

The products may be used either alone or in admixtures with other bodies, for instance, reducing and oxidizing agents, with soaps, salts, solvents or emulsifying stabilizers.

The following examples serve to illustrate the invention, but they are not intended to limit it thereto, the parts are by weight, unless otherwise stated:

(1) 322 parts of tri-isobutyl-phenylacetic acid chloride are mixed with 180 parts of sodium hydroxy-ethane-sulfonate (100%) and the mixture is quickly heated, while well stirring, to a temperature of 115° C.–120° C., this temperature being kept for one hour. The reaction product is, at temperatures below 10° C., neutralized by means of caustic soda solution in such a manner that the reaction in the neutralization vessel is always feebly alkaline to litmus paper. The reaction product is then adjusted by means of water to a content of 50% of the sodium salt of the tri-isobutyl-phenyl-acetic acid-ester of hydroxy-ethane-sulfonic acid.

A product of the following constitution is obtained:

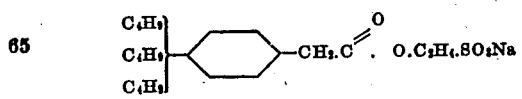

2 grams of this product, in the form of an aqueous solution of 5 per cent. strength, are added to 1 liter of water of 35° (German) hardness. A feebly opalescent solution is obtained which is adapted for wetting and cleansing wool as well as cotton.

(2) 161 parts of the sodium salt of methyl-taurine are, in the form of an aqueous solution of 10 per cent. strength, introduced into a vessel provided with a stirrer and 322 parts of tri-iso-butyl-phenylacetic acid chloride are caused to run in, drop by drop, while stirring, at a temperature of 20° C.–25° C. and such an amount of caustic soda solution is run in that the reaction in the reaction vessel is always alkaline to phenol-phthalein. The reaction mixture is further heated, for one hour, while stirring, at 50° C.–55° C. and, by means of water, it is then adjusted to a content of 50% of the sodium salt of the tri-isobutyl-phenyl-acetic acid methyltauride.

A product of the following constitution is thus obtained:

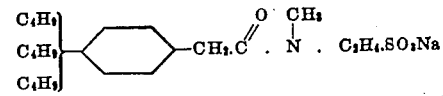

The reaction product yields even in water of more than 35° (German) hardness clear liquors. 2 grams of this product, dissolved in one liter of water, yield a liquor which is adapted for washing goods soiled with mineral and vegetable oils.

(3) 75 parts of hydro-cinnamic acid are dissolved in 200 parts of n-butyl alcohol and 350 parts of sulfuric acid monohydrate are run into the mixture, at 50° C.–60° C., within the course of one hour. The whole is stirred, for 7½ hours, at 50° C.–60° C. and, for 8 hours, at 75° C.–85° C. The reaction product which dissolves in caustic soda solution to a clear solution and which consists for the main part of tetra-isobutyl-hydrocinnamic acid, may either directly be neutralized or be purified by way of the calcium salt.

By causing 400 parts of tetraisobutyl-hydrocinnamic acid chloride to react, in an aqueous alkaline solution, according to Schotten-Baumann as described in Example 2 with 200 parts of the potassium salt of methyl-taurine, a product of the following constitution is obtained:

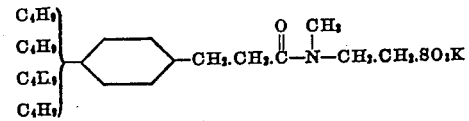

The product may be used in the same manner as that obtained according to Example 2.

(4) In the course of half an hour, 66 parts of phosphorus trichloride are added at 45° C.–50° C. in a closed apparatus to 300 parts of commercial di-isohexyl-hydrocinnamic acid, with exclusion of atmospheric moisture. Stirring is continued for one hour at 50° C.–55° C., the whole is allowed to stand for some hours and the bottom layer is then separated. The acid chloride thus obtained is run into an aqueous solution of 10 per cent. strength of 170 parts of sodium amino-ethanol-sulfate and caustic soda solution is simultaneously added in such a manner that the whole shows always a feebly alkaline reaction to phenol-phthalein. Stirring is continued for some time at 40° C.–50° C. The reaction product obtained which corresponds to the following formula:

and dissolves in water to a clear solution, is rendered feebly alkaline to litmus paper by means of caustic soda solution.

It may be used as washing agent even in hard water, for instance, for washing raw greasy wool. For this purpose 2–4 parts of the product are dissolved in 1000 parts of water of 12° (German) hardness; raw greasy wool having a fat content of 12 per cent. is washed with this solution for half an hour at 40° C.–50° C.

(5) 318 parts of diisohexyl-phenylacetic acid chloride are mixed with 235 parts of potassium para-phenol-sulfonate and the mixture is heated, while well stirring, at 105° C.–115° C. When the evolution of hydrogen chloride is terminated and the reaction mass can no longer be stirred, it is further heated, for 1 hour, at 115° C.–125° C. After cooling, the reaction product is neutralized by kneading it with sodium carbonate and water. A paste is obtained which dissolves in hot water to a clear solution and which may be used as dispersing agent. The reaction takes place according to the following scheme:

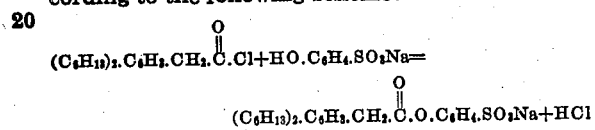

(6) 200 parts of sodium 1.2-cyclohexanol-sulfonate are introduced into 360 parts of anhydrous pyridine and the mixture is heated at 60° C.–70° C. 360 parts of diisooctyl-hydro-cinnamic acid chloride are then caused to run in, drop by drop, within the course of half an hour and the whole is further stirred at this temperature for one hour. The reaction product dissolves in dilute caustic soda solution to a clear solution. 110 parts of a caustic soda solution of 37 per cent. strength are added thereto and the product is evaporated. The residue may be purified by recrystallizing it from aqueous alcohol. The reaction may be illustrated by the following scheme:

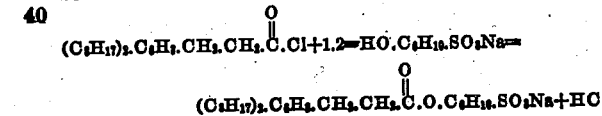

(7) 200 parts of sodium metanilate are dissolved in 800 parts of water and 300 parts of tetra-propyl-phenylacetic acid chloride are added thereto within the course of 2 hours, while stirring, at a temperature of 15° C.–25° C., the reaction being always feebly alkaline to phenol-phthalein. The whole is further stirred, for one hour, at 40° C.–50° C., the alkaline reaction to phenol-phthalein being maintained. Thereupon, the reaction product is, by means of dilute sulfuric acid, rendered feebly alkaline to litmus paper. It easily dissolves in water and may be used, for instance, as wetting agent. The reaction may be illustrated by the following scheme:

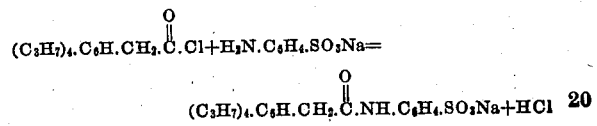

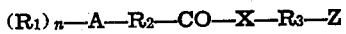

A similar product may be obtained by using, instead of metanilic acid, N-phenyl-taurine.

We claim:

The products of the general formula:

$$(R_1)_n—A—R_2—CO—X—R_3—Z$$

wherein $R_1$ stands for an aliphatic hydrocarbon radical of at least 3 carbon atoms, $n$ is an integer from 2 to 4, A stands for an aromatic hydrocarbon radical, $R_2$ means an aliphatic hydrocarbon radical, X is a member of the group consisting of O, NH, —N-alkyl, —N-aryl; $R_3$ is an alkylene group, Z is a member of the group consisting of $SO_3H$ and $OSO_3H$.

ADOLF STEINDORFF.
CARL PLATZ.
JOHANN ROSENBACH.